US007080034B1

(12) United States Patent
Reams

(10) Patent No.: US 7,080,034 B1
(45) Date of Patent: Jul. 18, 2006

(54) INTERACTIVE SPECIALTY COMMODITIES INFORMATION AND EXCHANGE SYSTEM AND METHOD

(76) Inventor: John M. Reams, 420 Neil Sherrod Rd., Bells, TN (US) 38006

( * ) Notice: Subject to any disclaimer, the term of this patent is extended or adjusted under 35 U.S.C. 154(b) by 0 days.

(21) Appl. No.: 09/565,704

(22) Filed: May 4, 2000

(51) Int. Cl.
*G06Q 40/00* (2006.01)
(52) U.S. Cl. .......................................... 705/37; 705/35
(58) Field of Classification Search .................. 705/37, 705/39, 8, 35
See application file for complete search history.

(56) References Cited

U.S. PATENT DOCUMENTS

| | | | | |
|---|---|---|---|---|
| 4,003,728 | A | * | 1/1977 | Rath .............................. 62/78 |
| 5,168,446 | A | * | 12/1992 | Wiseman ..................... 364/408 |
| 5,686,888 | A | * | 11/1997 | Welles et al. .......... 340/539.13 |
| 5,715,402 | A | * | 2/1998 | Popolo ........................ 395/237 |
| 5,978,771 | A | * | 11/1999 | Vandivier, III ................. 705/8 |
| 6,073,114 | A | * | 6/2000 | Perkins, III .................. 705/28 |
| 6,219,653 | B1 | * | 4/2001 | O'Neill et al. .............. 705/400 |
| 6,317,728 | B1 | * | 11/2001 | Kane ........................... 705/37 |
| 6,474,927 | B1 | * | 11/2002 | McAdams et al. .......... 414/340 |

OTHER PUBLICATIONS

Drabenstott, New Rural Policies for a New Century, *The Main Street Economist*, pp. 1-4, (Mar. 2000).
News Release, First Shipment of Supercede Grades High, *E-Markets*, (Feb. 10, 2000).
Specialty Grains, *Cooperative Business International, Inc.*, pp. 1-3.
A Discussion Paper, *A Mixed Logistics Strategy for Canadian Grain*, Prepared for 23rd Australasian Transportation Research Forum, (Sep. 29, 1999).
Reichert, Logistical Overview, *Identity Preserved Grain*, Jan. 2000.
OmniTRACS, Products and Technology, *OmnitractMobile Information Management System*, (Internet web page Apr. 5, 2000).
OmniTRACS, Products and Technology, *QTRACS System Software*, (Internet web page Apr. 5, 2000).

* cited by examiner

*Primary Examiner*—Alain L. Bashore
(74) *Attorney, Agent, or Firm*—Dinsmore & Shohl LLP

(57) ABSTRACT

An interactive database and real time exchange system for specialty commodity products and other products that must have their identity preserved from trade to delivery. The database includes specialty commodity products available from member producers and other information related to such products, and is accessible to system users, preferably through an interactive network system. An automated exchange director provides for real time matching of specific products in the database with corresponding bids from system users, and executes trades of accepted matches for identified units of the specific products. A delivery module is provided in communication with the exchange director, and implements delivery logistics and tracking of the identified unit between the trade and completed delivery. The system can further include a forum interactive module which allows communication between and among system users, such as through chat rooms and specific product forum pages. In one embodiment applicable specifically to agricultural specialty commodity products, the system further includes a monitor for periodically providing information to the system about the condition of the specific product in a traded identified unit during delivery. The system and process provide a central exchange which includes interactive access to all information needed for production, marketing, researching, trading, use and delivery of specialty commodity products, optimizing quality, timing and exchange price for all concerned.

29 Claims, 8 Drawing Sheets

INTERACTIVE SPECIALTY COMMODITIES INFORMATION AND EXCHANGE SYSTEM AND METHOD

TECHNICAL FIELD

This invention relates to a system for the exchange of information and trading of speciality products which must have their identity preserved so that the buyers know exactly what they will receive upon delivery, and more particularly to a convenient system which can be accessed on-line or via a communication network that enables buyers and potential buyers to obtain all of the information needed about a specialty product and to actually purchase that product and get it delivered as desired. In a preferred embodiment, the present invention comprises an on-line system and process which provides a catalog or database for researching speciality commodity products available for purchase from exchange member producers, an associated exchange coordinator system for executing trades between matching bids and offers of system users, as well as an associated delivery system for then implementing shipment of the identified product to buyers. Additional aspects such as delivery tracking, payment handling, insurance, dispute resolution, as well as an interactive forum between and among users of the system, are also provided in preferred embodiments.

BACKGROUND ART

Commodities such as agricultural and mining products have long been exchanged on open market systems available to the public. Before about 1850, most grain and similar products were marketed in sacks and shipped via inland waterways or other forms of water transport. In the mid-1800s, a new method of handling grain in bulk was invented for use with a new system of transportation, the railroad, and shortly thereafter a grading system was first introduced by the Chicago Board of Trade. A network of storage silos, known as elevators, grew up to service this bulk handling system. The ability to mix the harvest of such fungible commodities from various farms and producers further eliminated a need for buyers and sellers of the products to be in physical proximity to the product, and reduced the price of shipping where transportation of the products was done in large volumes or blocks.

As communications and transportation became more efficient during the 20th century, there was a build-up of centralized warehouses in major urban centers, while less local and regional exchanges disappeared. Today, billions of dollars worth of commodities, including grain, minerals, energy products, metals, wood and precious materials, are traded on a dozen or less exchanges throughout the world. The bulk storage and transportation system which has been implemented to handle storage and delivery of the world's commodities, however, requires relatively significant and costly infrastructure, including storage tanks and silos, rail equipment, highways and transportation equipment itself. Many parts of the world simply do not have the assets or wherewithal to implement and maintain the needed infrastructure for efficient bulk transportation delivery systems. While large bulk shipments may be lower in costs with respect to transportation in areas with adequate infrastructure, such a system imposes requirements and costs which cannot be met in many parts of the world, and carry with them high inventory holding and storage costs, especially for importers.

Moreover, rising incomes and standards of living around the world are leading to more needs for specialized products such as differentiated foods, and market forces are driving an increase in the demand for specific product attributes and higher value products. For example, consumer demand for more varied food products, fresher produce, and ingredients free from "unnatural" additives and preservatives, has forced many manufacturers, millers and food processors to look for new supply chain solutions. Many processors and other entities need specialty commodities to achieve improved features and qualities, for existing or new products for consumption by humans or animals, but have trouble gaining access to them under the present market system. Just-in-time inventory control techniques also require commodity products having specific attributes to be prepared in smaller "batches" or supply runs in order to satisfy their customers. Such specialty commodity products must have their identity preserved from producer to user, whereby the user obtains exactly the product ordered in the condition needed, at exactly the right place, at the right time. As used herein, the term "identity preservation" denotes the identification of a particular speciality product in its container as loaded by the producer for shipping to the customer or user. Identity preservation means that the product, once packaged and traded, will not be mixed, co-mingled, or otherwise combined with any other products, such that its nature and characteristics are fully maintained and can be "tracked" from producer to customer or user.

Speciality commodities generally can be products which originate from a specific region or farm, or which represent a particular variety or selection of product, agronomic practices, special handling techniques, or the like; but they will also include a specific variation of the product or crop which has been specially developed to provide desirable performance, characteristics or other particular end results in use. A familiar example of specialty commodity products would include "premium" grain, such as wheat or corn, which includes a specified protein content. As consumer tastes become more sophisticated, manufacturing and processing plants around the world are also becoming more automated, and technology is being used to produce characteristics of end products that need to be preserved for different uses and users. As a result, producers are finding it more important than ever to preserve the identity of grains and other specialty commodity products from the point of production (e.g., the farm) to the user, manufacturer or producer. Not unlike hand-made or one-of-a-kind products or collectibles, these specialty commodities must have their particular identities preserved at all times between the producer and end user to satisfy the customers' demands.

The ability to efficiently deliver specialty commodity products generally requires the use of a system other than the bulk transit system, as use of grain silos, elevators and drayage is not conducive (and generally contradictory) to identity preservation of the specialty products in transportation. Since about the mid-1960s, deep-sea container services have been available for the transport of general cargo, and "container shipping" has become a relatively common way to move all types of products, especially in the higher-value cargo market. A shipping container is a box, usually made of a combination of wood, steel and/or other materials with significant strength and reusability, designed to enable goods such as grains and other products to be loaded and shipped from producer to user without the contents being handled during the shipment. Shipping containers, also known as ISO containers, are widely utilized throughout the world in two standard sizes, and are often fabricated from marine plywood flooring and corrugated steel sidewalls. In contrast to bulk shipping, containerized shipments of specialty commodity products allows, for example, a miller to specifically tailor processed grains or the like to the exacting specifications of a particular buyer.

Moreover, while the demand for specialty commodities is growing rapidly, presently it is quite difficult for a buyer or user of these specialized products to gain access to the information needed to understand what products are or might be available for particular applications, or what a "reasonable" price for a particular product is at any given time. In particular, there exists no central repository or exchange which provides consumers or would-be customers for speciality commodity products access to such information. As a result, capabilities of producers and technology available to create new speciality commodities is not fully utilized, as the potential for such use is not easily accessible by the public and/or prospective customers for such products, and the market is inefficient and non-responsive.

DISCLOSURE OF THE INVENTION

The following present some of the objects of the present invention, but are not intended to be, nor are they provided as in any way limiting the scope of this invention or representing all aspects thereof. It is an object of the present invention to address the shortcomings of previously available access to the specialty commodities market by providing an effective exchange system and process for such products and similar products which must have their identity preserved from trade execution to delivery.

It is another object of the present invention to provide a system for specialty commodity products and other products which must have their identity preserved from trade through delivery, where a buyer can obtain all of the information about a product needed to determine, for example, the availability, applicability, viability, and price for products which can meet particular needs, and then actually consummate a trade for such products in a convenient and reliable manner.

It is yet another object of the present invention to provide an interactive real time exchange system for specialty commodity products and other products which must have their identity preserved, as well as a process for providing a database for collecting information from all aspects of the product industry so that users can access, exchange and research such information, share product availability, features and needs, and an efficient market for such products can be reasonably implemented on a network basis for executing and implementing trade and delivery of those products.

It is another object of the present invention to provide an interactive real time exchange system and process for centralizing all relevant information relating to specialty commodity products to assist in the leveraging of technology to enable access and efficient exchange and delivery of specialty commodity products and other products requiring identity preservation between trade and delivery on a global basis.

It is also an object of the present invention to apply developing communication and product technology to enable the ready accessability and exchange of information relating to specialty commodity products and other identity preserved products which can be shipped in containerized packages, whereby users can access an exchange information, and an efficient system of matching supply and demand for executing trades and tracking the containerized product from trade to delivery.

In accordance with one aspect of the present invention, there is provided an interactive real time exchange system for speciality commodity products and other products that must have their identity preserved from trade to delivery, wherein the system includes a database of the products available from member producers which is accessible to system users, preferably by a networking system such as the world-wide web or Internet. The system further includes an automated exchange director for providing real time matching of specific products in the database with corresponding bids from system users, then executing trades of accepted matches for identified units of the specific products. Those identified units are preferably containerized packages or shipping containers for specialty commodity products in particular. The system also includes a delivery module in communication with the exchange director, whereby the identified units of specific products traded can be tracked between the executed trade and completed delivery. In a preferred embodiment, each shipping container is also provided with a tracking device, which can comprise a machine-readable label such as a bar code label, and/or a device for monitoring one or more physical characteristics of the contained product for similar tracking and control.

In other embodiments of the present invention, there can be provided additional parts of the system to improve the convenience and applicability of the system for handling additional aspects of a product trade or delivery. For example, the system can include an auction module having executable instructions for automatically coordinating the matching of spot offerings of speciality commodity products by member producers with bids received from one or more system users. Similarly, the exchange coordinator can have associated elements which provide options for system users to choose and implement various insurance options, payment methods, delivery options, and/or dispute resolution procedures. Also, it is contemplated that the database associated with the system can include additional modules that provide for convenient linking to third-party web sites or other proprietary content, product sample delivery arrangements, customer service and technical support, and an index of frequently asked questions. In a preferred embodiment, the system might also include an interactive module for allowing applications such as chat rooms among system users, or even secured direct communications between particular users of the system.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
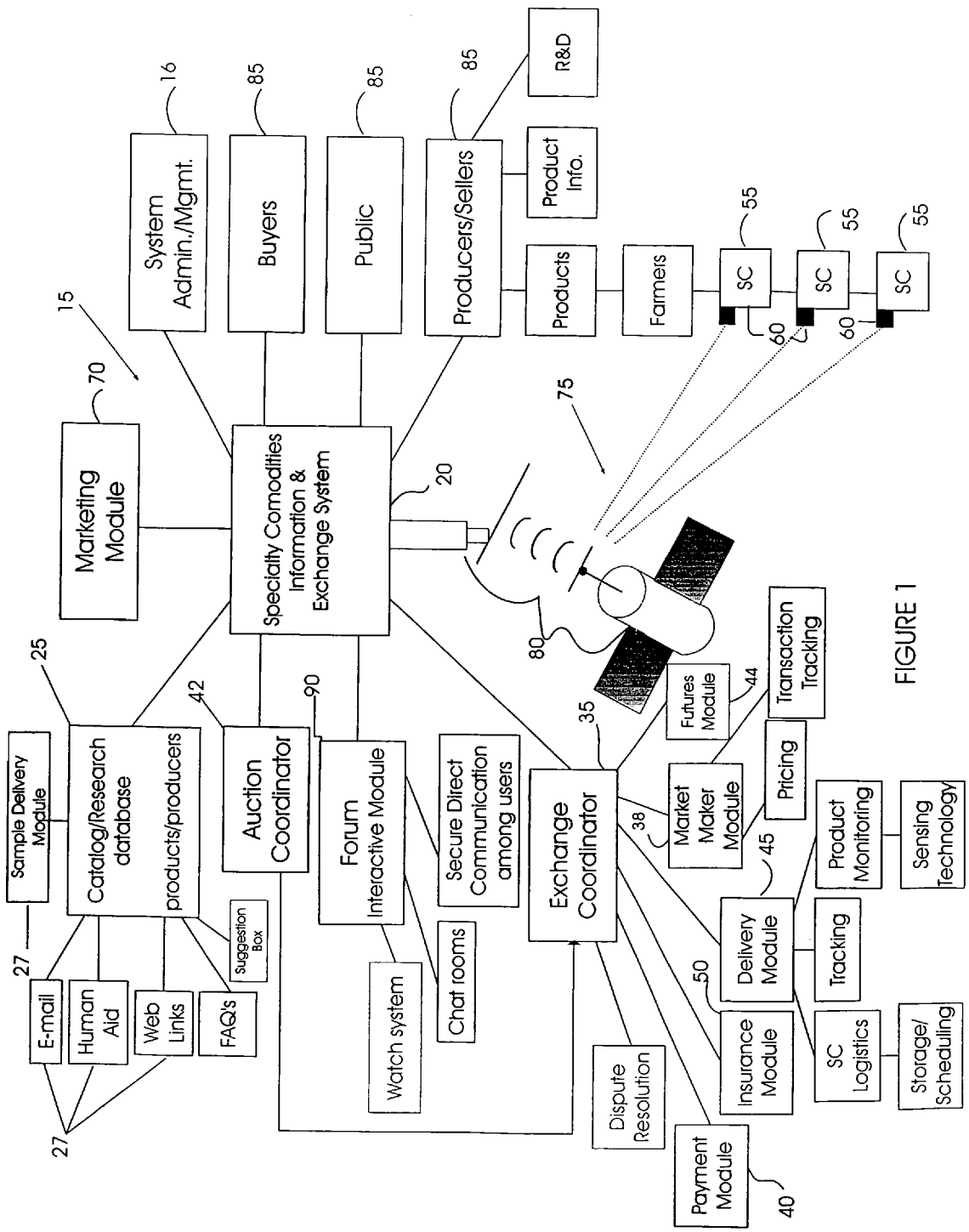
FIG. 1 is a schematic view of an exemplary embodiment of an interactive exchange system and process in accordance with the present invention.

Referring now to the drawings in detail, wherein like numerals indicate the same elements throughout the views, FIG. 1 illustrates schematically an exemplary embodiment of an interactive exchange system made in accordance with the present invention and the process associated therewith. As used herein, the term "specialty commodities" or "specialty commodity products" generally refers to products which must have their identity preserved through completed delivery, such as genetically modified agricultural products for specific end uses, such as improved grains with specified protein levels, organic wheat, food grade soybeans, white corn, waxy corn, and nutritionally dense corn. While the examples set forth herein will generally be directed to such specialty commodity products, it should be understood that it is contemplated that the present invention could be equally applicable to any product which must have its identity preserved (sometimes referred to herein as "IP products") so that the purchaser can be assured of exactly what they will be receiving upon completed delivery.

As set forth above, more new specialty agricultural commodity products are being developed than ever before as a result of improved technology, improved standards of living around the world, and increased demand for higher quality and more differentiated food products. The production of such improved products requires specialty agricultural commodities, but there has been a severe lack of readily available information about those products, and there has been no convenient or practical way for buyers and potential buyers around the world to obtain current information with respect to the availability, desirability (or applicability), or reasonable pricing for specialty commodity products. Similarly, producers have not had access to readily available or centralized information about the demand or potential demand for new products or products that need to be developed. As also described above, the current bulk transfer system widely utilized for common agricultural commodity products is not a viable alternative for distribution of specialty commodity products or other IP products of higher value and generally lower volume requirements. Undeveloped and underdeveloped regions of the globe also are at a disadvantage with respect to access to products which must be delivered in the traditional bulk transfer process due to insufficient infrastructure. Moreover, specialty commodity products are generally "unlisted" on the major exchanges, and have traditionally been available only to sophisticated buyers having access to brokers or others who can obtain the needed products through the spot market, word of mouth, or the like.

The system of the present invention addresses all of these shortcomings and inefficiencies of the exchange and transportation systems heretofore available for specialty commodity products and other IP products. As seen in the drawing figures, the present invention contemplates the provision of an interactive exchange system 15 which preferably includes a centralized database or catalog research database 25 intended to collect, store, index and provide ready access to system users for any and all information relating to specialty commodity products. From here on, reference herein to specialty commodity products will be assumed to also include IP products which can be shipped in identified units such as shipping containers. Shipping containers are known in the transportation industry, as described above, to connote relatively standardized and reusable shipping devices which can be readily transported on vehicles, ships, trains, and airplanes in the usual course of business. There are also advantages in that they are available from many sources, and are generally interchangeable and relatively "fungible" in the shipping industry. Consequently, their use is readily acceptable and generally compatible with existing global transportation infrastructure.

As seen in the overall schematic view of FIG. 1, the interactive exchange system 15 of the present invention preferably comprises a central system coordinator or housing 20 which can comprise one or more computers or other processing equipment, as will be generally discussed in greater detail herein. The central system coordinator 20 will preferably include a processor, and will either house or be in communication with the catalog/research database 25. It is contemplated that the system of the present invention will include at least an initial marketing module or marketing effort (designated 70 in FIG. 1) which will begin the sign-up and qualification of system users to begin the process of collecting relevant specialty commodity product information for the database. For example, producers and users of the system will preferably be required to appropriately document their ability to deliver high-quality specialty commodity products as described in any relevant literature and information to be included in the database, their ability and responsibility to enter into executable trades, and to sign user agreements requiring them to agree to be obligated to make payment and to deliver product as required in any executed trade. In the agricultural specialty commodity products area, producers might be required to be members of the Corn Growers Association, Wheat Growers Association, and/or the Soybean Growers Association, as appropriate, for example, as a prerequisite to becoming a member of the system 15.

In this regard, it is also contemplated that member users, producers and the like might preferably have to establish a "deposit account" which would include sufficient minimum funds to back up purchases, letters of credit (LOC's), and/or liquidated damages where contracts are terminated or otherwise not properly fulfilled. Membership agreements for users of the system might include a requirement for the establishment of an applicable letter of credit by buyers in the system within ten (10) days of any trade execution, as is standard in the commodities exchange business. Member requirements would, of course, have to be determined as applicable to the particular industry and the setup of any particular system 15.

As seen in FIG. 1, it is further contemplated that users of the system might include buyers, producers/sellers (which could include farmers, product processors, seed companies, pesticide companies and fertilizer companies), and the public. These various system users are all indicated by the indicia numbers 85 illustrating user nodes or interfaces in FIG. 1. Buyer users of a system used for agricultural specialty commodity products might include bakers, millers, food product manufacturers, and specialty product re-sellers. Public users might include students, meteorologists, weather persons, equipment companies, communications products and services providers, research universities and the like. While it is contemplated that initial marketing efforts might include collection of database information by many and various means, including electronic communication, printed or written materials and catalog information, product specifications and the like, in a preferred embodiment, users 85 of the system would at some point in time have direct access to the subject system 15 and its database 25 to facilitate the more direct exchange of information accordingly. In fact, it is contemplated that the catalog/research database 25 might preferably include software or other executable instructions which enable the database to automatically and continually solicit input and information from system users, such as in the form of questions being posed to users during interactions, surveys, and monitoring of user information and activities obtained during interactive sessions.

Figure 2:
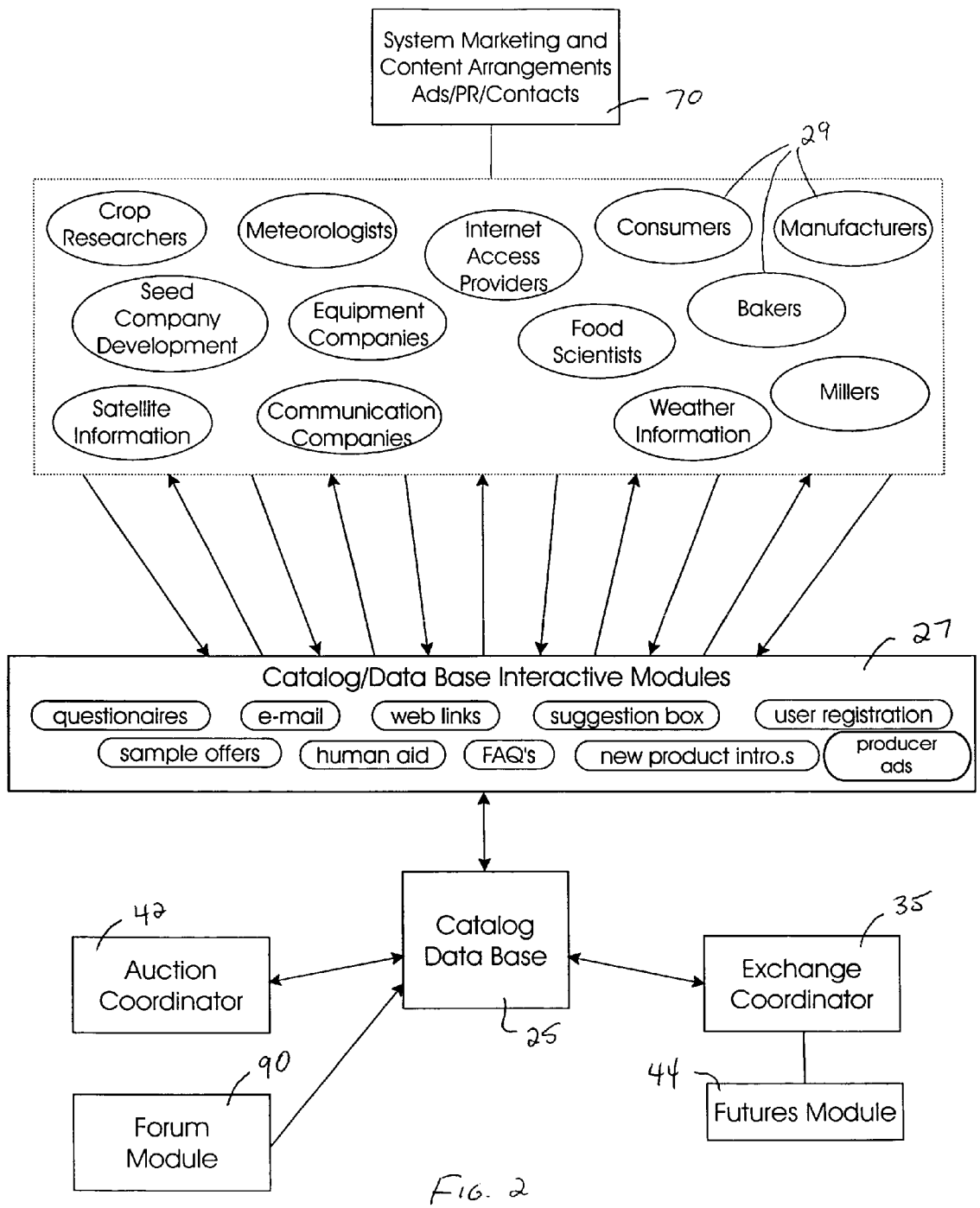
FIG. 2 is a partial schematic illustration of the database collection and interaction arrangement of a preferred embodiment of an interactive system made in accordance herewith.

FIG. 2 illustrates a partial schematic depiction of the marketing and database collection arrangement which has been briefly described. Particularly, the system marketing and content arrangements (shown generally at 70) might include advertisement, public relations, and other contacts and solicitations to attract member users of the system. As it is desirable to include in database 25, all of the information reasonably related to any aspect of the subject specialty commodity products, including but not limited to research, testing, production, specifications, availability, pricing, uses, performance, and feedback for each of the specialty commodity products to be offered or developed in the industry, the database will be constantly updated, expanded and improved as new information becomes available. It is contemplated that the database could be provided using off the shelf technology such as an open, relational database program, and could be hosted on any appropriate computer or server such as via an NCR Terabyte™ database server. Generally, this aspect of the system could be implemented by various methods known for optimizing data collection, warehousing, and indexing to facilitate "data mining" by users in an efficient manner. As will be described below with respect to FIG. 8, the catalog/database 25 might preferably be part of or in communication with one or more central system servers (e.g., 20).

As schematically shown in FIG. 2, it is contemplated that the various database sources 29 (which may or may not also be system members or users) will also preferably have interactive access to the database 25 through one or more of the interactive modules 27 associated with the database. The interactive modules 27 shown in FIG. 2 are provided only as exemplary of the various mechanisms or ways through which database information can be gathered and exchanged, either through the system marketing module 70 or through interactive communication with system 20 by a database source 29. For example, information important to the database will certainly be gathered and updated through one or more of the modules including member or user registration (as described above), questionnaires, sample offers provided during interaction, e-mail correspondence, human aid (e.g., live or virtual customer service experts), web link interaction, use of the frequently asked questions (FAQ's) module, suggestions or input from the users through the suggestion box module, and/or through new product introductions provided by member producers.

Figure 3:
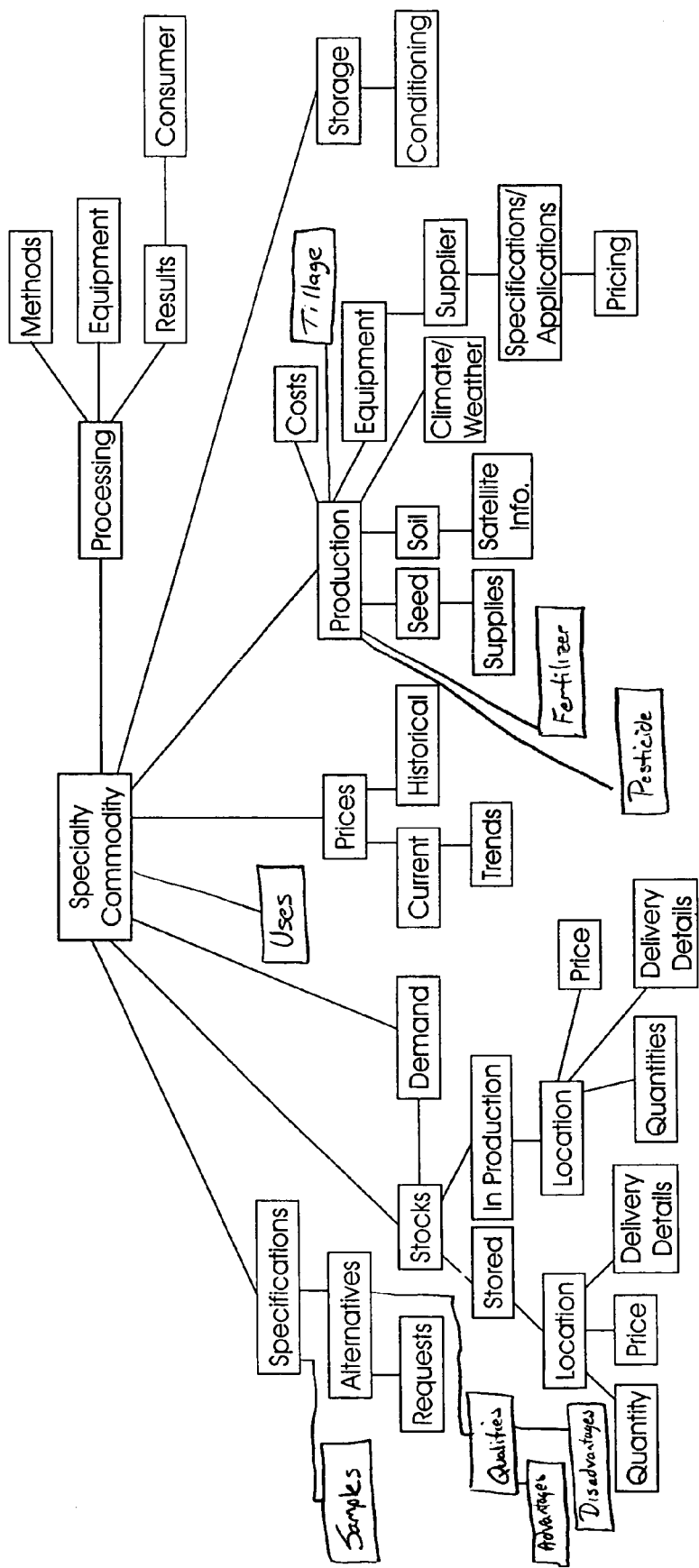
FIG. 3 is a partial schematic illustration of exemplary details of database files which might preferably be included in the research catalog or database of a system made in accordance herewith.

A product sample module might also be included as shown in FIGS. 1 and 3, for providing executable instructions for implementing the delivery of product samples requested by users, such as by matching user address information and the link with the producer for triggering the sample delivery and/or delivery tracking. This module might also be provided with instructions for following up with the user to verify delivery of the sample and obtain feedback for the producer and the database. It is further contemplated that samples of products (when available from the producer) might be maintained by the system operator and/or in conjunction with a third party outsourcing warehouse or expediter for housing samples and responding to user requests. As will be discussed in further detail below, in addition to providing access to system users for research, information exchange, and product trade execution, the catalog/database 25 will also be in communication with other parts of the system to facilitate the exchange transactions, product delivery, and forum modules accordingly.

FIG. 3 illustrates a partial schematic of exemplary details of the database files which might preferably be provided within a database 25 of an application of the present invention for specialty commodity products. For example, users of the system would desire to have access to specifications of available specialty commodity products, as well as alternative products which might be available to provide similar desirable product performance, end results or characteristics. Also, it would be desirable to allow system users to input requests for particular types of products which may or may not be related to or similar to existing products available. This allows the present system to provide producers in the industry with valuable information as to potential new products for development and/or future demand for new areas of investigation. For example, cholesterol-lowering grains or soybeans might be known to grow better in certain identified geographies versus certain others. similarly, the desirability of a particular location for growing a newly developed commodity might be identifiable through this database collection. It is believed that the availability of a central source for collection and exchange of this information will further speed the development of additional and higher value products important for the improvement of quality of life and leveraging of technological advancements. Similarly, FIG. 3 shows other exemplary files which might include existing stocks of particular available specialty commodity products, information about storage and location of such products, and, of course, price and quantities available. As will be understood, real time availability of this information in an interactive system of the present invention will provide unprecedented efficiencies for the specialty commodity markets, product production, shipping options, and inventory control for all concerned. It is contemplated that this data store will also facilitate the matching of demand and availability to better balance the pricing and availability of high-value and high-quality products throughout the world.

It is contemplated that the database for agricultural product applications would include information relating to the production of specialty commodity products, including information relating to soil characteristics, requirements for particular crops, weather and environment issues relating to planting, growing and crop production, appropriate crops for particular soils or geography, as well as information relating to production processes and equipment available for research, planting, growing crops, tillage requirements, harvest, production, storage and transportation. On the processing side of the equation, the database would also preferably include information relating to equipment options, applications and processing alternatives/requirements for various specialty commodity products and desirable end products, as well as feedback and information on actual results and performance for particular specialty commodity products. As the system of the present invention is contemplated as providing real time exchange and updating of all of this information, the knowledge and efficiencies provided will improve the basis for decisions at all levels of specialty commodity product invention, production, exchange, and use. All of the files in the database relating to any particular product would be linked for convenient and seamless access by users for research, bidding, trading and tracking, for example.

Figure 4:
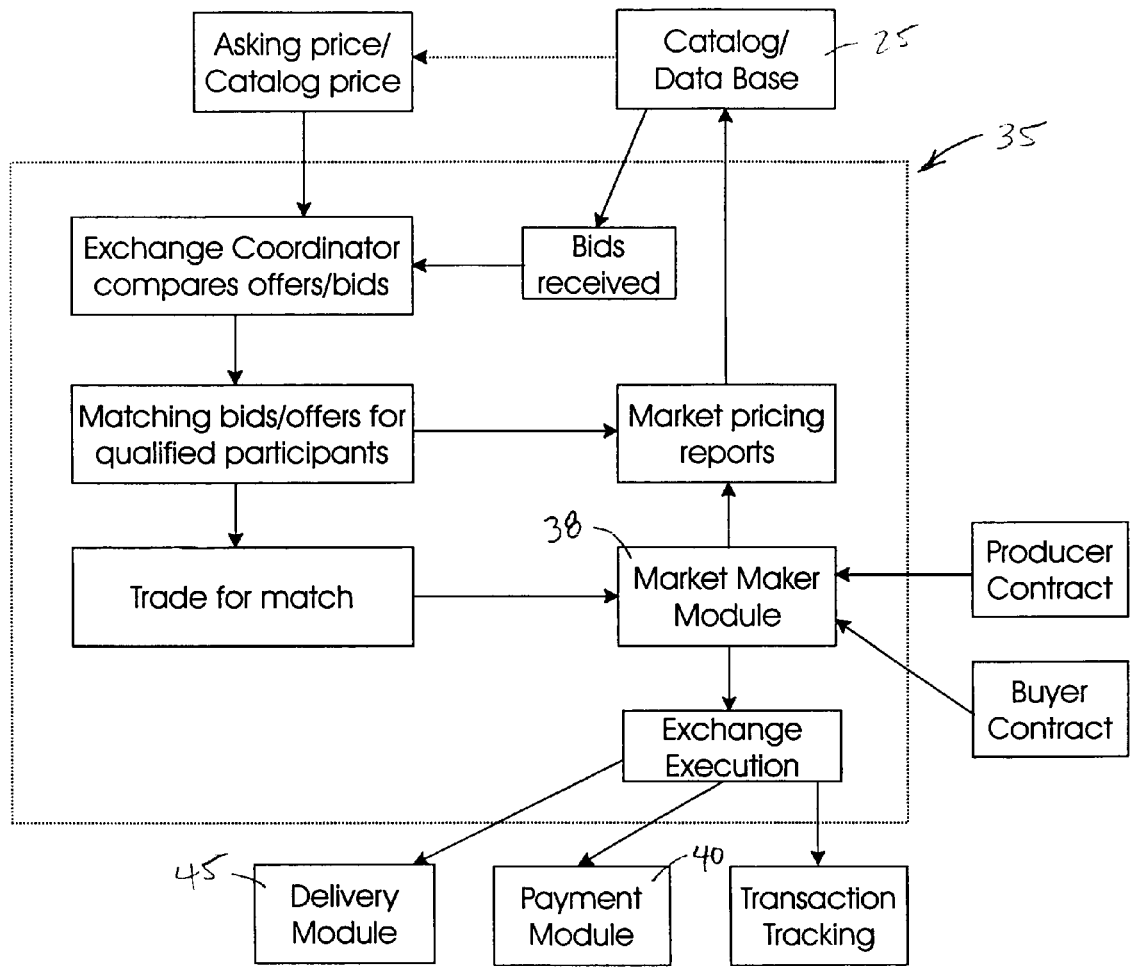
FIG. 4 is a schematic view of the exchange coordinator portion of a system such as illustrated in FIG. 1.

FIG. 4 is a schematic of details of an exemplary exchange coordinator made in accordance with the present invention for facilitating the matching of available specialty commodity products in the system with user bids, and executing trades of those matches accordingly. The exchange coordinator is shown generally as element 35, and is in communication with the catalog/database 25 in order to compare catalog (or asking) prices provided by member producers with bids received from users/buyers from time to time. As will be understood, it is contemplated that a user/buyer 85 will access the database 25 to research specialty commodity products which might be applicable to their needs. Based upon the information gathered in the database, a user might submit a bid or offer for purchase of a particular quantity of a particular specialty commodity product listed in the catalog. While such a bidding process could be undertaken in a variety of manners utilizing various formats, an example of such a system would be the commonly-available on-line shopping systems which allow a product to be purchased by entry of appropriate pricing, quantity and delivery date information. It is contemplated that a variety of off-the-shelf software products and/or other proprietary executable instructions could be provided to the exchange coordinator for allowing a user/buyer to access the exchange coordinator 35 through the specialty commodities system 20 (and/or directly from the database research module). Exchange related programs and applications which may be used to implement this portion of the system can be obtained from various sources such as Broadvision and others. Similarly, a system administrator might choose to contract out part or all of the exchange activities to a third party provider.

All bids would have to be submitted in accordance with the user contracts previously signed by the user and otherwise abiding by all purchase offer procedures of a particular system 15. It is contemplated that the user interface screens would provide a real time matching or listing of all bids and offers for a particular speciality commodity product at any given time. A trade will be executed when a buyer accepts a producer's offer, or a producer accepts a buyer's offer. This could be done manually by the accepting party, or the exchange coordinator could automatically determine whether a user bid for a particular specialty commodity product and quantity matched any available catalog items from the database as offered by member producers in accordance with trading rules established in the system or by law. As part of this matching process, it is contemplated that the exchange coordinator would also provide ongoing reports to the database 25 with respect to real time bids matched to product offerings, and trades of particular products. In this way, an ongoing market or "exchange" would be established, whereby users of the system could identify current prices and compare them with pricing trends over time. The actual hardware and software arrangement for enabling this aspect of the exchange coordinator identified as the market maker module 38 might be similar to common on-line brokerage services such as available from Schwab, Morgan Stanley, E-Trade and others. Market prices could thereby be tracked in the system on a real time basis as appropriate.

Where the exchange coordinator 35 receives an acceptance of a matching bid for a particular specialty commodity product offered by a member producer (whether that acceptance is manually implemented by a party or automatically determined by the system 20), particular "units" of that specialty commodity product would be "tagged" in the system as being under contract or sold, and the trade would be moved through the market maker module 38 for exchange execution. As mentioned, the Exchange Coordinator would also display all trades (preferably anonymously) as they occur. As shown schematically in FIG. 4, the exchange coordinator would likely verify that the user/buyer and the producer involved in the match were both current members of the system with existing signed contract documentation on record, and would check for appropriate LOC's and/or system account balances. Upon verification, the trade would be executed, with both producer and buyer being immediately notified and the database being immediately updated to account for the trade execution. The buyer would make payment arrangements through the settlement partner and/or as specified in the system user contracts.

It is contemplated that the exchange coordinator could also include optional modules for completing the necessary transaction payment, such as by automatically debiting the buyer's system account, passing the transaction to an affiliated financing institution or settlement partner, or by forwarding the appropriate documents and/or data to an intermediary chosen by the parties for transaction completion. It is also contemplated that the system would preferably automatically deduct any applicable transaction fee from the involved parties' system accounts according to the system user agreement. At this time, it is also contemplated that the transaction details, as well as the identification of the particular unit or shipping container information for the traded specialty commodity product be forwarded to the delivery module and transaction tracking elements of the system, as will be described.

Figure 5:
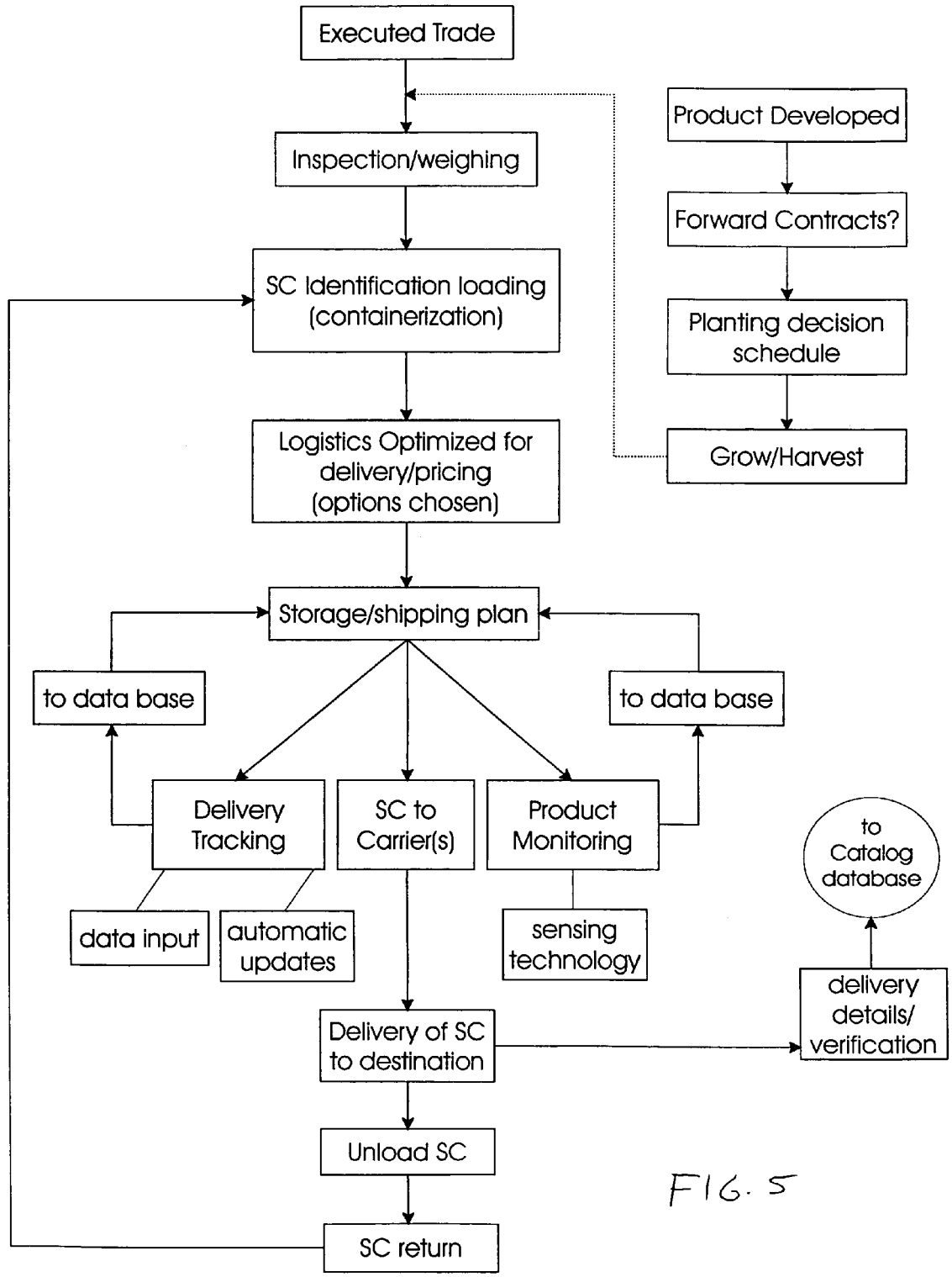
FIG. 5 is a general flow chart illustrating an exemplary delivery process as might be implemented through the delivery module of the system of the present invention.

FIG. 5 shows a general flow chart of an exemplary delivery module process as contemplated in one embodiment of the present invention. As indicated generally in FIG. 5, the development of a particular specialty commodity product would obviously precede the production of that product and its availability for exchange on the present system. However, it is contemplated that information with respect to particular specialty commodity products that have been developed and that are anticipated to be available at a future time can be included in the database, as forward contracting of these products is quite common and generally required to allow for production planning and efficient asset allocation in all phases of the planting, harvest and production.

Picking up at the executed trade at the top of FIG. 5, the next logical step in the process is verification of inspection and weighing of the particular specialty commodity product in the unit specified for the trade (e.g., one shipping container), and to assess the initial condition and verify its compliance with the product specifications. It should be understood that the inspection and weighing of particular units of these products may well be undertaken before any trade is executed. For example, products which have already been harvested for a particular year may well have been inspected, weighed and loaded into respective shipping containers at a particular loading facility or on the farm where the harvest as completed. Thereafter, the identified individual shipping containers can be stored for later trade. Those identified shipping containers or units might simply be verified at the time of a trade by an inspector provided by the exchange Coordinator, and the system inspector might add a bar code or other readable verification indicator (including weight and grade information) to the unit for tracking and identification.

Because products contemplated in the present invention are to be packaged in containerized or unitized devices such as shipping containers, they can be easily stored on-premise at a production facility or a producer's farm, and need not (and in most cases, should not) be transported to a storage silo or grain elevator. Consequently, storage of the units and monitoring of the condition of the products therein can be simplified and improved by allowing the individual units to be maintained at a secure location until execution of the trade and release of any particular unit to a freight forwarder or other transportation contractor. For example, maintaining proper temperature, moisture and pressure can be done more efficiently at the producer's storage location until release of a particular traded unit to a freight forwarder.

Once the inspection and weighing processes have been completed for a particular unit, that unit or shipping container should be identified accordingly. In this regard, each shipping container would preferably be provided with a tracking device to preserve the identity of the product unit through final delivery. For example, a tracking device might preferably comprise a bar code label or other identifier tag affixed to a shipping container and identifying the contents, weight, and other pertinent information such as inspection dates, producer identification information and the like. There are available a wide variety of machine-readable labeling devices such as bar code labels which can be produced on-site and in conjunction with an inspection verification team. Once identified and labeled, the shipping container can be stored at the production facility or farm, or moved to a convenient central shipping queuing station as desired.

It is also contemplated in the present invention that additional tracking devices could alternatively and/or additionally be utilized to not only provide identification for the shipping container, but also to monitor the condition of the product housed there within. For example, tracking devices utilized with shipping containers in the present invention might further include tell-tales such as temperature, pressure, physical orientation, or other physical measuring devices to constantly monitor particular internal or external phenomenon related to the shipping container and/or specialty commodity product there within. For example, a product which must be maintained above freezing could include tracking device tell-tales that indicate if the product ever dipped below the freezing temperature mark. Similarly, pressure tell-tales could be utilized to ensure that a specialty commodity product was maintained above a certain minimum pressure to ensure that the product was shipping in a pressurized compartment of an airplane, for example.

There is also technology available to monitor the moisture level, temperature, pressure, and, possibly, pest infestation during storage and transportation. Such monitoring device(s) might also include a transmitter for providing periodic or constant, real time monitoring of physical characteristics of the product and/or shipping container. For some high-value products, it might be desirable to embed one or more of these monitoring devices or probes within a shipping container for tracking purposes between product identification and final delivery. These various tracking devices are indicated schematically in FIG. 8 as elements 60. It is contemplated that if monitoring devices indicate some discrepancy, actions would be undertaken to address the situation. For example, if the moisture level was found to be too low, arrangements would be made to humidify the product. Humidifying devices, desiccation equipment and/or fumigant dispensers for pest control might also be provided on board of a shipping container for some high value products so that anticipated critical maintenance actions might be implemented automatically if desired.

Once a unit or shipping container for the traded specialty commodity product has been identified and containerized, the logistics for delivery can be optimized. As will be understood, a multitude of delivery options can be available to the parties, depending upon such variables as the timing of availability of the product, the need for delivery of the product, cost limitations, transportation conditions and the like. As illustrated in FIG. 5, as part of the logistics, an appropriate storage and shipping plan would be developed, as well as the parties' preference for delivery tracking and product monitoring. A buyer might want to contract with the producer to store the identified unit(s) for later delivery. Eventually, the shipping container involved in a particular trade would be released to a freight forwarder for moving the shipping container from its storage or loading area to one or more interim destinations and/or its final destination. The freight forwarder would then generally make all necessary arrangements for delivering the shipping container to the buyer at the designated destination and within the delivery date requirements. If the contract is for future production (forward contract), the producer will be required to notify the Exchange Coordinator through system 20 in advance of harvest so that the freight forwarder can be notified for delivery of a shipping container for loading. It is contemplated that the Exchange Coordinator would notify the producer of delivery timing for necessary shipping containers 55, as well as any cleaning, lining or other pre-loading preparation that may be required.

As indicated in the illustration, information relating to delivery tracking and product monitoring (if any) would be updated periodically (or in real time if desired) to the system database 25 for access by the parties to the trade. There are a variety of tracking programs available in the industry, such as the OmniTRACS® service available from Qualcom, as well as a number of commonly known tracking programs such as used by Federal Express, UPS, and a variety of on-line retailers around the globe. It is also contemplated that upon completion of delivery, the database would be updated to verify all kinds of information available to all users such as products delivered during a certain time period, producer dependability, transportation conditions, as well as any user feedback which might be helpful to other users in the system. Upon delivery of a containerized shipment, the shipping containers would be unloaded and returned to the general container pool within the transportation system for eventual re-loading and shipping of other products.

It is similarly contemplated that tracking of the shipping container and/or monitoring of the product within the shipping container between trade and delivery in the present process could be accomplished by any variety of tracking technologies presently available or as will be improved and updated in the future. For example, each shipping container could be fitted with a transmitter for communicating tracking information such as temperature, location, and the like via wireless communication or satellite relays to a receiver (the communication equipment and tracking assembly generally referenced as 80 in FIG. 1) in communication with database 25. This communication technology is also available in the industry (and will be constantly changing and improved) and further details will not be included herein. Where tracking devices (e.g., 60) will be utilized, the Exchange Coordinator could be programmed to provide the proper monitoring and tracking equipment for use with each shipping container.

A tracking device of the present invention might include a global positioning system (G.P.S.) for automatically determining the geographical location of a shipping container, especially where automatic or constant updates are desired. Another tracking system might include the bar code system discussed above utilizing a bar code reader at various locations along the scheduled shipping route, whereby, periodically, the bar code could be read and the information passed through software and communication devices which would relay the location and other specifics of the product unit back to database 25 for updates. Similarly, the tracking system could be even more simple, utilizing manual input by data input personnel at various times or locations during transportation of the shipping container to its final destination.

Figure 6:
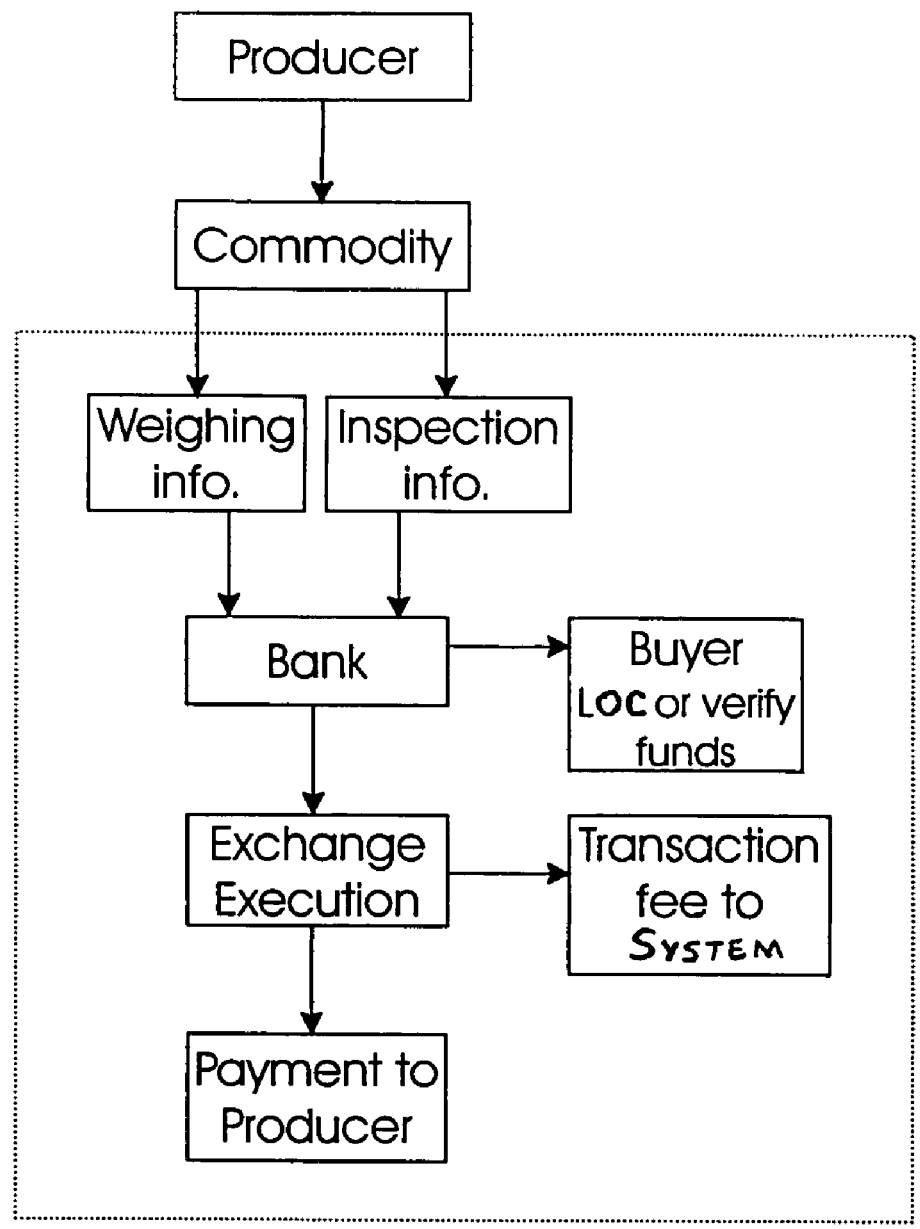
FIG. 6 is a general flow chart showing an exemplary payment process as might be implemented by a payment module such as illustrated in FIG. 1.

FIG. 6 illustrates a general flow chart of an exemplary payment process which might be implemented through the payment modules 40 shown in FIGS. 1 and 4. Particularly, the member producer involved in a particular trade would obviously provide the specialty commodity product involved. As discussed above, that product is weighed and inspected, and that information would be provided to the payment module for inclusion in the documentation forwarded to the financial intermediary. Similarly, the buyer would provide verification of funds, preferably through the maintenance of an account with the trading system 15 of the present invention, or through maintenance of appropriate verified letters of credit or the like. That documentation is also supplied to the financial institution, preferably through the present exchange system 15. Once all documentation is verified, the exchange is executed, and any transaction fee due to the operator of the interactive exchange system would preferably be automatically debited from the parties' accounts. Similarly, payment for the products would be held on account for the producer and/or forwarded to the producer, as appropriate, pending completion of delivery as discussed.

As illustrated in FIG. 1, it is contemplated that an Insurance Module 50 might also be associated with the present system 20. This additional feature might be provided in the form of a program or set of executable codes or the like for presenting the parties with options and access to insurance on products involved. While the actual contracts for the insurable interests involved would generally be set up between the insurance providers and an individual buyer or seller, system 20 might preferably facilitate immediate access to acquisition of appropriate insurance coverage by providing those options as part of the trade execution. Generally, the buyer would be responsible for insurance coverage on the shipping container and its contents from the time of loading and weighting/inspection verification.

Likewise, FIG. 1 illustrates a Dispute Resolution module which might also provide system user with access to information, contacts, and/or services for resolving disputes arising from any aspect of the information exchange, bidding or trades facilitated by system 20. This module could include interactive components to respond to frequently asked questions, or may work in conjunction with the database 25 to provide access to dispute resolution alternatives, information and available resolution services.

Figure 7:
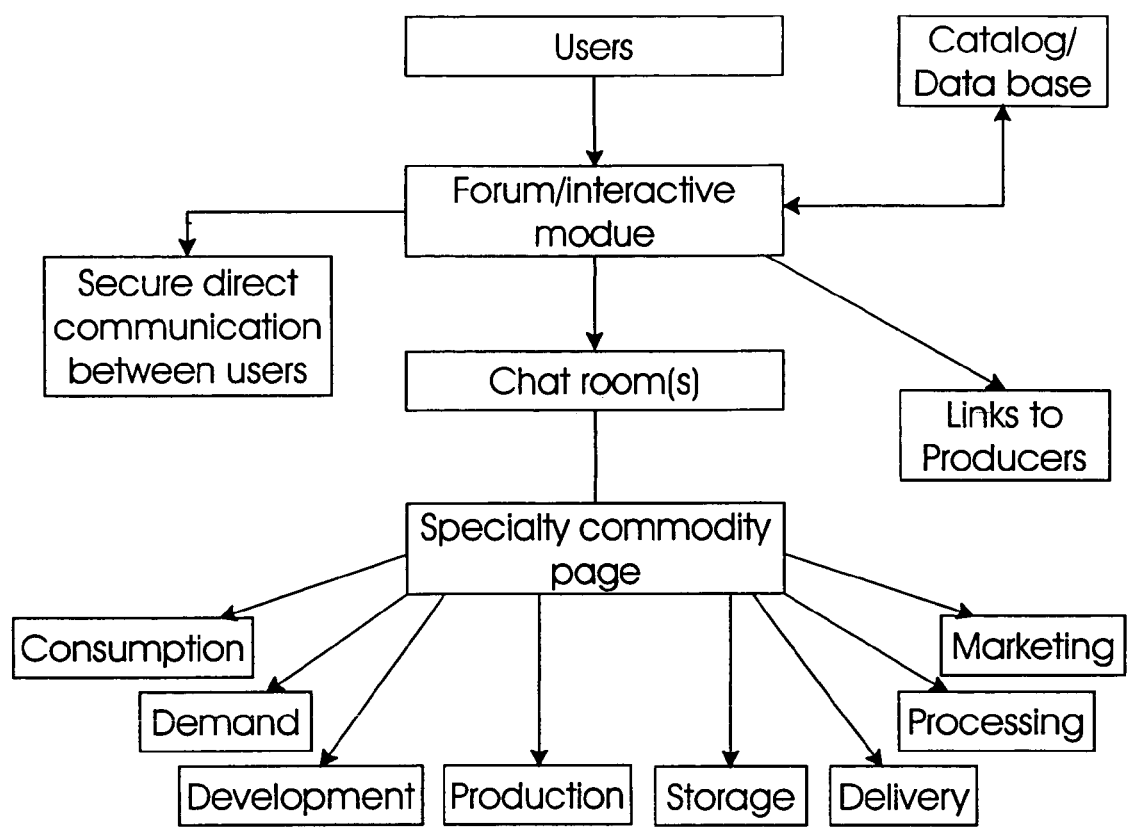
FIG. 7 is a general flow chart showing an exemplary forum interactive module as illustrated in FIG. 1.

FIG. 7 illustrates another general flow chart showing an exemplary forum/interactive module as generally also illustrated in FIG. 1. While the forum module 90 is shown in FIG. 1 as being directly linked to system users 85 through system server 20 of the specialty commodities exchange system 15, it should be understood that this module could be provided as part of the catalog/research database 25 as well. Particularly, in providing an information exchange and learning center as contemplated herein through the establishment and constant updating and improvement of the catalog/research database 25, it is also believed that the provision of a central forum for system users and industry participants for interactive discussions of current products, problems, needs and visions for the future will further facilitate growth of the knowledge and synergism of the subject interactive exchange system. It is believed that the ability for producers, buyers, manufacturers, service providers, researchers, environmentalists, and all those having any interest or concern in an area to which such an exchange system is dedicated (for example agricultural specialty commodity products), can only help to boost the understanding, knowledge and efficiency of the natural development and commercialization processes. This should also allow technology to be leveraged and more easily accessed and exchanged on a global basis.

Figure 8:
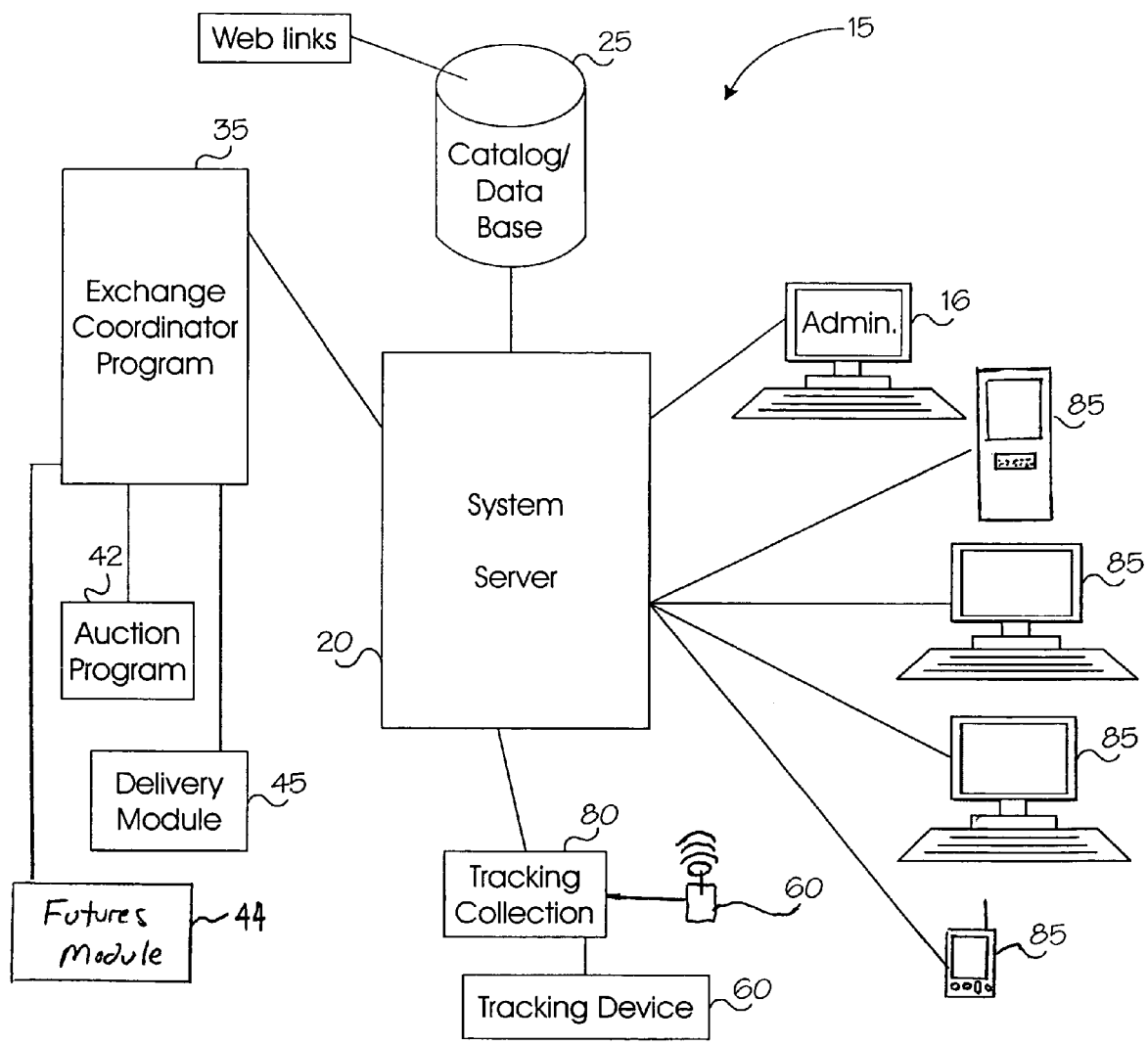
FIG. 8 is a simplified schematic illustration of an exemplary hardware arrangement for one embodiment of a system made in accordance with the present invention.

As seen in FIG. 7, it is contemplated that the users 85 would access the forum/interactive module 90, which itself would be preferably linked with the catalog/database 25 through system server 20. As will be understood from the disclosure herein, and as generally illustrated in FIG. 8 as discussed below, while access to the forum/interactive module 90 by users can be accomplished by any variety of devices and communication links, in a preferred embodiment, system server 20 might be utilized in a host network arrangement such as a wide-area network, a local area network, through the World Wide Web, and/or on the Internet. As presently configured, the Internet and World Wide Web operate on a client/server model, and the user would generally run a web client, or browser, on an electronic device such as a computer, a personal digital assistant (PDA), a cell phone, a television tuner, or similar access device. The web browser contacts a web server and requests data information, generally in the form of a uniform resource locator (URL). Typically, URL addresses are typed into the browser to access web pages, and URL addresses are embedded within the pages themselves to provide hypertext links to other pages. A hypertext link allows the user to click on the link and be redirected to the corresponding web site (i.e., to the URL address of the hypertext link).

Many browsers currently exist for accessing the World Wide Web, such as Netscape Navigator from Netscape Communications Corp., Internet Explorer from Microsoft Corporation, and the like. Similarly, numerous web servers exist for providing content to the World Wide Web, such as Apache from the Apache Group, Internet Information Server from Microsoft Corp., Lotus Domino Go Webserver from IBM, Netscape Enterprise from Netscape Communications Corp, and Oracle Web Application Server from Oracle Corporation. These browsers and web servers can be utilized to allow access to the present invention from virtually any web-accessible device. The forum module of the present invention might be handled by a web server application of this type.

Once connected with the forum/interactive module 90 of the present system, a user would preferably be allowed access to a variety of interactive options. As described above, a user could at least access various areas of the catalog/database 25 for research, shopping for available products, and/or for executing trades. The forum/interactive module 90, however, is contemplated as providing users access to interactive chat rooms, bulletin boards and other links to producers, manufacturers, service providers or the like. It is also contemplated that an option might preferably be made available where individual users can set up secure, direct communication links for more specialized interaction. Again, these various options can be currently provided in the form of software commonly available in the industry, and/or via hypertext links as briefly described above. For example, chat room arrangements can be set up through existing technology as available from software providers (e.g., examples of providers of chat facilities for websites can be found at casualforms.com and eshare.com).

As illustrated in FIG. 7, it is contemplated that chat rooms would also allow users access to specialty commodity product pages which would be set up to address any of the multitude of interest areas for any particular specialty commodity product. For example, as shown, any agricultural specialty commodity page might include sub-categories related to consumption, demand, research and development, production, harvest, processing, storage, delivery, and marketing, just to name some obvious areas of interest. It is contemplated that specialized chat rooms might be directed to any one of these elements, or a combination of related elements, as desired. It is also contemplated that the hardware and software for the forum/interactive module 90 would be such that information from the chat rooms and bulletin board and other public interactions facilitated would be available through the database 25 as part of the universe of information being collected and updated constantly with respect to the products and services for which the overall specialty commodities exchange system 15 was established. In this way, the system of the present invention would become the font of information and the only exchange system necessary for the products at issue, as it would provide the system users, including all producers, buyers and the public alike, with unprecedented access to real time exchanges of information and trade execution in a reliable, open and convenient manner.

Turning to FIG. 8, an exemplary embodiment of a specialty commodities exchange system 15 of the present invention is shown in simplified, schematic format. As mentioned, the heart of the system would preferably comprise a central system coordinator which would include a processor, preferably in the form of one or more system servers 20. That central system coordinator would be in communication with the exchange coordinator program or exchange director 35 of the system, and in some applications the exchange coordinator program could be resident on one or more system servers 20. Obviously, for a critical exchange system such as for agricultural specialty commodity products, redundant systems would be desirable, and it is contemplated that system servers would be located in strategic points around the globe to ensure access and proper operation of the system on an around-the-clock (24/7) basis.

Similarly, the auction program 42 for processing existing products available for immediate purchase which had not been previously contracted for delivery (i.e., spot market sales) by member producers, is shown as being connected with the exchange coordinator program 35. It is contemplated that such an interrelationship will be desirable to take advantage of the exchange coordinator setup and executables for delivery, payment, insurance, dispute resolution and the like. However, it should be understood that the auction module 42 could alternatively be provided as a separate program such as shown in FIG. 1, and may or may not tie into the exchange program or exchange coordinator directly. Similarly, FIG. 8 illustrates product and transaction tracking from tracking devices 60 such as bar code labels, sensing devices, shipping tell-tales and the like, in communication with tracking collection equipment 80. As also indicated in FIG. 1, such tracking collection equipment (e.g., tracking assembly 75) can include satellite communication equipment, wireless communication such as cellular technology, or might include manual data entry at selected data entry nodes, periodic scanning of bar codes or other product information and documentation, or other information collection and monitoring technology as appropriate.

As generally shown in FIG. 8, it is contemplated that the network of users will access system 15 via a user node or system user interface 85. Such interfaces can be alternatively provided in the form of personal computers, wireless application programs (WAP's) such as cell phones, PDA's, interactive TV or Internet appliances, or through stand-alone kiosks, which themselves might include a screen or other monitor and data entry devices (e.g., keyboards, USB ports, voice input devices or the like). The system user interfaces 85 can generally comprise any device for accessing the interconnected system 15. The setup might be a common client/server network, where portions of the network applications that interact with human users are typically separated from the portions of the network application that process requests and information. In a preferred embodiment of the invention, the user interface might typically comprise a client machine, such as a network computer, stand-alone computer, interactive kiosk, PDA, or the like, and software containing executable instructions which comprise the methods according to the present invention being located on a server computer, separate from the client machine.

The system server (e.g., 20) is thereby interconnected with a plurality of client nodes or system user interfaces 85 using a connection such a token ring, Ethernet, telephone modem connection, radio or microwave connection, parallel cables, serial cables, telephone lines, universal serial bus (USB), fire wire, blue tooth, fiber optics, infrared (IR), radio frequency (RF) or similar devices or combinations thereof. System server 20 might comprise, for example, one or more computer servers, such as a Dell™ PowerEdge 8450, which itself comprises a plurality of processors with sufficient memory capacity. As mentioned above, the catalog/database 25 can be provided in one or more locations and devices, and would preferably include a relational database such as the Oracle™ 8i database. As also discussed above, interactive modules 27 are preferably associated with the database 25, including web links to third-party content.

Users would access the database, and the requested data structure would be transmitted from the central server to the users node for viewing and interaction. As discussed above, the catalog/research database 25 will include an appropriate database having a plurality of specific specialty commodity products segregated for research and easy access, with associated files of product-specific information relating to such product. Because the exchange elements of system 20 for facilitating trading of the products will be associated with the database, it is contemplated that product identifying information will be assigned to available products within the system. Such identifying information, such as a catalog or serial number or other indicia can then be used to submit bids and offers via the Exchange Coordinator as described herein. For example, a user would identify a desired product by its identifying information (e.g., catalog code number) when submitting a bid and/or accepting an offer of a producer. This would help ensure that identified units of any particular speciality commodity product would be traceable at all times.

It is contemplated that system 15 might also include one or more proxy servers for storing Internet sites available to users through the system server 20. As understood, proxy servers download web sites and periodically recheck the content to ensure updated information is presented to the user, however, the consumer accesses these third-party web sites through the user interface and not directly through a separate Internet connection. Exemplary proxy servers include Microsoft Proxy Server from Microsoft Corporation, Novel BorderManager from Novel Corporation, and Netscape Proxy Server from Netscape Communications. Appropriate text filters might also be employed automatically or via the system administrator including executable instructions for monitoring all screen messages and text inputted by users through one of the system user interfaces 85, to appropriately filter out inapplicable, offensive, or derogatory language.

As also seen in FIG. 8, an administrative access node 16 is also preferably provided to allow system supervision, maintenance, upgrades and general monitoring of the interactive exchange system of the present invention. While this administrative node could well be located on site with the system server in some applications, for larger systems such as a global agricultural specialty commodities interactive exchange system as discussed and described herein, it is preferred that the administrative node 16 have the ability to access the system from remote locations. Particularly, where redundant systems, regional data centers or system servers, offsite backup systems, or where the various elements of the system such as the exchange coordinator and catalog database aspects are housed separately, the system administrator will need ready access to any and all components at any time.

As illustrated both in FIGS. 1 and 8, an appropriate application for a system of the present invention might include a Futures Module 44 associated with the Exchange Coordinator which can accommodate the exchange of information, bidding and traded executions of futures and options deals. For example, in the specialty agriculture products area, futures contracts for particular quantities of specialty products might be offered, bid upon and exchanged in a manner similar to commonly understood futures and options contacts in the industry, but based upon a product offering from a producer in the catalog 25 of the system.

It might be desired to maintain the Futures Module in a segregated manner form the forward contracts and other trades between producers and customers for actual delivery of product hereunder, as futures transactions are subject to scrutiny and regulation by the Commodities Futures Trading Commission (CFTC). In order to provide a full service exchange system, however, the availability of this module for such investment and speculation aspects may be desirable. Again, the availability of the associated catalog and research database and real time bidding and trading of these financial aspects of specialty products would allow all information needed for providing an efficient exchange system to be simultaneously accessible to all users.

Consequently, as described herein, the present invention provides a unique interactive real time exchange system for specialty commodity products and other products that must have their identity preserved from trade to delivery, providing essentially unlimited access to all information needed by any person affiliated with any aspect of the industry to learn the history, problems, products, uses, technology, processes, pricing and logistics of the subject products and industry. Moreover, in addition to facilitating the collection, updating, and exchange of all information relating to specialty commodity products and services, the exchange system allows for convenient and prompt execution of trades of such products and services, and implements all necessary transactions and delivery while simultaneously updating the database of information for use by others in the industry. The information exchange and updating can be undertaken in real time by using the latest technologies and network-based applications. As such, the present system and process provides a unique supply chain linking together the information, resources and services to tie together the entire industry for products, including research, development, production, processing, marketing, delivery, and historical archiving of performance, price and other information related thereto.

The present system can be specifically directed to applications such as agricultural specialty commodity products such as the genetically modified crops and the like directed for specific end uses and performance characteristics, and, as such, would provide an exchange system for producers and buyers with respect to available products. Those products would often be exchanged based upon forward contracting (i.e., advance contract sales for identified units of upcoming plantings and harvest production), and for spot sales of product already harvested but not yet sold (i.e., not forward contracted, excess production, etc.). In this way, it will be understood that the system provides assurances for system users that the products and services are being exchanged at "market price" based upon availability, product characteristics, demand and the like. Previously, specialty commodity products that were sold through the spot market often had to be sold at general bulk commodity prices because appropriate buyers could not be easily located, thereby not reflecting the technology and performance characteristics of that specialty product, and leading to inefficient markets and leveraging of technology. The information provided to the users of the system through the interactive database will help to eliminate the "disconnects" that have plagued the specialty commodity product markets due to lack of knowledge, lack of access to information relating to availability, performance, pricing and the like.

The present system is based on its central database and takes advantage of the containerized shipping model, augmented by the tracking, monitoring, and sensing capabilities of modern technology to ensure preservation of identity and delivery of specified quality and condition of products from trade to completed delivery. Because the system can also take advantage of the latest monitoring, tracking, and communication technologies as they are improved or invented, it is contemplated that the present system can easily adapt and will be upgraded constantly with technology innovations to essentially allow the provision of real time interactive exchange of information, trading, execution of trades, tracking of deliveries through completion with quality control, and accelerated development and leveraging of new technologies for products and processes in a real time, 24 hours, 7 days a week (24/7) environment. In this way, quality, timing (inclusive of timing of product conception and development, marketing, availability, trading, and just in time delivery) and pricing will be simultaneously improved to provide a more efficient market and to enable accessability to higher quality products throughout the globe.

Having shown and described the preferred embodiments of the present invention, further adaptions of the interactive exchange system for specialty commodity products of the present invention as described herein can be accomplished by appropriate modifications by one of ordinary skill in the art without departing from the scope of the present invention. Several of these potential modifications and alternatives have been mentioned, and others will be apparent to those skilled in the art. For example, while exemplary embodiments of the inventive system and process have been discussed for illustrative purposes, it should be understood that the elements described will be constantly updated and improved by technological advances. Similarly, as described, the exchange system and process of this invention could be applied with just about any agricultural commodity or other product which can be shipped in shipping containers. Accordingly, the scope of the present invention should be considered in terms of the following claims and is understood not to be limited to the details of structure, operation or process steps as shown and described in the specification and drawings.

I claim:

1. An interactive information and product exchange system for specialty agricultural commodity products that must have their identity preserved from producer to completed delivery, said system comprising:
   (a) a database of specialty agricultural commodity information and products available from member producers of said products, said database being accessible for interactive use by system users;
   (b) an automated exchange director providing real time matching of specific specialty products in the database utilizing all bids submitted by system users, executing trades of accepted matches for at least one identified unit of a specific products, and real time reporting and updating of matched bids and trades to said database; and
   (c) a delivery module in communication with said exchange director, said delivery module including executable instructions for tracking the identified unit with said specific product between the trade and completed delivery, wherein said specific product is not mixed with other product varieties between said trade and said delivery.

2. The system of claim 1, wherein each identified unit of a specific product is housed in at least one shipping container.

3. The system of claim 2, wherein said system further comprises a tracking device for each identified unit associated with the shipping container.

4. The system of claim 3, wherein said tracking device comprises label on said container including identifying information about the specific product and identified unit.

5. The system of claim 3, wherein said tracking device comprises a monitor having a transmitter for periodically providing information to said system about said specific product in a shipping container.

6. The system of claim 5, wherein said monitor comprises a probe at least partially embedable in said specific product for sampling one or more physical characteristic of said specific product in the shipping container.

7. The system of claim 1, further comprising a central system coordinator which includes a processor, said central system coordinator being in communication with said exchange director, database and delivery module, and providing an interface thereto for system users.

8. The system of claim 2, said system further comprising a tracking device for each identified unit attached to the shipping container, and wherein said central system coordinator is in communication with a receiver for collecting periodic updates of information from said tracking device.

9. The system of claim 1, wherein said system includes executable instructions to provide system users with access to research said database.

10. An interactive real time information and product exchange system for specialty agricultural commodity products that must have their identity preserved for delivery, said system comprising:
    (a) a database of specific specialty agricultural commodity products offered by member producers of said products and other information relating to specialty agricultural commodity products, said database being accessible to system users for interactive research;
    (b) an automated exchange director for providing real time matching of specific products in the database utilizing all bids submitted by system users, executing trades of accepted matches for at least one identified unit of a specific products, and real time reporting and updating of bids and trades to said database;
    (c) at least one shipping container in which is housed said at least one identified unit of said specific product traded, wherein said specific product is not mixed with other product varieties within said shipping container;
    (d) a tracking device associated with the shipping container for each identified unit of said specific product; and
    (e) a delivery module in communication with said exchange director, said delivery module including executable instructions for periodically receiving updates including information from said tracking device to track the identified unit to completed delivery.

11. The system of claim 10, further comprising an auction module including executable instructions for coordinating the matching of a specific identified unit of specialty commodity products offered by a member producer with bids of one or more system users.

12. The system of claim 10, wherein said tracking device comprises label on said container including identifying information about the specific product and identified unit.

13. The system of claim 10, wherein said tracking device comprises a monitor having a transmitter for periodically providing information to said system about said specific product in a shipping container.

14. The system of claim 13, wherein said monitor comprises a probe at least partially embedable in said specific product for sampling one or more physical characteristic of said specific product in the shipping container.

15. The system of claim 10, further comprising a central system coordinator which includes a processor, said central system coordinator being in communication with said exchange director, database and delivery module, and providing an interface thereto for system users.

16. The system of claim 10, further comprising a forum module including executable instructions for enabling interactive communication among system users.

17. The system of claim 15, wherein said system coordinator comprises a computer processor connected to system users by a network.

18. A method for providing an interactive real time exchange for specialty commodity products that must have their identity preserved through delivery, comprising the steps:
    providing a network accessible database of specialty agricultural commodity product related information and products offered by member producers of said products for purchase by system users;

providing an automated exchange director adapted to provide real time matching of specific products in the database utilizing all bids submitted by system users, executing trades of accepted matches for at least one identified unit of a specific products, and real time reporting and updating of matched bids and trades to said database;

providing at least one shipping container for housing said at least one identified unit of the specific specialty product traded, wherein said specialty product is not mixed with other product varieties within said shipping container;

executing real time trades of accepted matches of identified units of said specific specialty commodity products; and tracking the identified unit and its shipping container through completed delivery.

19. The method of claim 18, further comprising the step of providing a tracking device associated with each shipping container for an identified unit.

20. The method of claim 19, further comprising the step of obtaining periodic updates with respect to said tracking device as to information for tracking said identified unit of said specific product between trade and final delivery.

21. The method of claim 20, wherein said tracking device comprises an identifier tag associated with said shipping container, and wherein information provided for tracking includes the real time location of said identified unit.

22. The method of claim 18, further comprising the step of collecting information related to one or more specialty commodity products from database sources.

23. The method of claim 18 wherein said database is also updated and augmented with product related information from system users.

24. A computer-readable data transmission containing a data structure embodied in a carrier wave for storing a plurality of specific identity preserved specialty agricultural commodity products available from member producers of said products, each such specific product being connected with one or more associated product-specific file containing available information relating to product characteristics, production specifics and price, and a product identifying signal representing at least one identified unit of such specific identity preserved specialty commodity products available for trade and which can be used for tracking of such identified unit through completed delivery after trade.

25. The data transmission of claim 24, wherein said signal can be utilized by a user to submit a bid for trade of the at least one identified unit.

26. The data transmission of claim 24, further comprising a portion which facilitates matching of units of identity preserved specialty agricultural commodity products available with existing bids for trade of such units.

27. A method in a computer system for displaying specific identity preserved specialty agricultural commodity products available from member producers for trade, comprising:

providing a listing of one or more specific identity preserved specialty agricultural commodity products available; providing information relating to the one or more listed specific identity preserved specialty commodity products upon request by the user; utilizing all bids submitted from system users; and matching said bids submitted for each such specific identity preserved specialty commodity product and displaying in real time all matched bids and offers therefor in conjunction with relevant quantity and delivery information.

28. An interactive marketing system for information relating to and availability of specialty products which can be shipped in a shipping container and which must have their identity preserved from producer to completed delivery, said system comprising:

(a) a database of specialty products available from member producers of said products and information relating to such specialty products, wherein the database is accessible for interactive use by system users;

(b) an automated exchange director providing real time matching of specific specialty products in the database utilizing all bids submitted by system users, executing trades of accepted matches for at least one identified unit of a specific products, and real time reporting and updating of matched bids and trades of such specialty products to said database;

(c) a delivery module in communication with said exchange director and including executable instructions for tracking said at least one identified unit of specialty products and its shipping container between the trade and completed delivery, wherein said specific product is not mixed with other product varieties within said shipping container.

29. The system of claim 28, further comprising a tracking device associated with the shipping container for at least one identified unit.

* * * * *

UNITED STATES PATENT AND TRADEMARK OFFICE
CERTIFICATE OF CORRECTION

| | | |
|---|---|---|
| PATENT NO. | : 7,080,034 B1 | Page 1 of 1 |
| APPLICATION NO. | : 09/565704 | |
| DATED | : July 18, 2006 | |
| INVENTOR(S) | : John M. Reams | |

It is certified that error appears in the above-identified patent and that said Letters Patent is hereby corrected as shown below:

Column 19, line 33, change "products" to -- product --.

Column 20, line 19, change "products" to -- product --.

Column 21, line 5, change "products" to -- product --.

Column 22, line 34, change "products" to -- product --.

Signed and Sealed this

Twenty-first Day of November, 2006

JON W. DUDAS
*Director of the United States Patent and Trademark Office*